US011013357B2

(12) United States Patent
Carcano et al.

(10) Patent No.: US 11,013,357 B2
(45) Date of Patent: May 25, 2021

(54) MODIFIED S-PARAMETER MEASUREMENT AND USAGE IN SOLID STATE RF OVEN ELECTRONICS

(71) Applicant: ILLINOIS TOOL WORKS INC., Glenview, IL (US)

(72) Inventors: Marco Carcano, Senago (IT); Michele Sclocchi, San Donato Milanese (IT); Daniele Chirico, Brugherio (IT)

(73) Assignee: Illinois Tool Works Inc., Glenview, IL (US)

( * ) Notice: Subject to any disclaimer, the term of this patent is extended or adjusted under 35 U.S.C. 154(b) by 392 days.

(21) Appl. No.: 15/903,219

(22) Filed: Feb. 23, 2018

(65) Prior Publication Data

US 2018/0249855 A1    Sep. 6, 2018

Related U.S. Application Data

(60) Provisional application No. 62/467,442, filed on Mar. 6, 2017.

(51) Int. Cl.
*A47J 27/00* (2006.01)
*H05B 6/68* (2006.01)
*A47J 43/08* (2006.01)

(52) U.S. Cl.
CPC ........... *A47J 27/004* (2013.01); *A47J 27/002* (2013.01); *A47J 43/08* (2013.01); *H05B 6/686* (2013.01);
(Continued)

(58) Field of Classification Search
CPC . A47J 27/002; A47J 27/004; H05B 2206/044; H05B 6/68
See application file for complete search history.

(56) References Cited

U.S. PATENT DOCUMENTS 8,242,782 B2 * 8/2012 Brannan ............ A61B 18/1815
324/415
8,796,593 B2 * 8/2014 Okajima ................ H05B 6/705
219/490
(Continued)

FOREIGN PATENT DOCUMENTS

EP    2168523 A2    3/2010
EP    2861040 A1    4/2015
(Continued)

OTHER PUBLICATIONS

Machine Translation of EP3073803A1 (Year: 2016).*
(Continued)

*Primary Examiner* — Jacob J Cigna
*Assistant Examiner* — Michael W Hotchkiss
(74) *Attorney, Agent, or Firm* — Burr & Forman LLP

(57) ABSTRACT

An oven includes a cooking chamber configured to receive a load and an RF heating system configured to provide RF energy into the cooking chamber using solid state electronic components. The solid state electronic components include power amplifier electronics configured to provide a signal into the cooking chamber via an antenna assembly. The power amplifier electronics include at least a first power amplifier and a second power amplifier operably coupled to the cooking chamber by respective ones of a first antenna and second antenna of the antenna assembly. The first and second antennas are operably coupled to respective ones of the first and second power amplifiers via a first coupling structure and a second coupling structure, respectively. A directional coupler provided at a port section defined for at least one of the first and second coupling structures. The directional coupler is configured to provide a forward wave parameter and a reflected wave parameter to a measurement
(Continued)

assembly configured to calculate modified S parameters at the port section.

13 Claims, 9 Drawing Sheets

(52) U.S. Cl.
CPC ......... *H05B 2206/044* (2013.01); *Y02B 40/00* (2013.01)

(56) References Cited

U.S. PATENT DOCUMENTS

| | | | | |
|---|---|---|---|---|
| 9,571,137 B2* | 2/2017 | Robert | ................ | H04B 1/0475 |
| 10,143,045 B2* | 11/2018 | Wesson | ................ | H05B 6/686 |
| 10,433,376 B2* | 10/2019 | Chaimov | ............ | H05B 6/6452 |
| 10,470,256 B2* | 11/2019 | DeCamillis | ............ | H05B 6/686 |
| 2013/0048880 A1* | 2/2013 | Einziger | ................ | H05B 6/705 |
| | | | | 250/492.1 |
| 2013/0080098 A1* | 3/2013 | Hadad | ................ | G06F 15/00 |
| | | | | 702/66 |
| 2014/0287100 A1* | 9/2014 | Libman | ................ | H05B 6/6441 |
| | | | | 426/87 |
| 2015/0070029 A1* | 3/2015 | Libman | ................ | G01N 22/00 |
| | | | | 324/637 |
| 2015/0156823 A1* | 6/2015 | Okajima | ................ | H05B 6/686 |
| | | | | 219/660 |
| 2015/0351164 A1* | 12/2015 | Wesson | ................ | H05B 6/6402 |
| | | | | 219/756 |
| 2016/0095171 A1* | 3/2016 | Chaimov | ............ | H05B 6/664 |
| | | | | 219/704 |
| 2018/0049279 A1* | 2/2018 | Guatta | ................ | G01R 21/133 |
| 2018/0063901 A1* | 3/2018 | Nachtom | ............ | H05B 6/688 |
| 2018/0249855 A1* | 9/2018 | Carcano | ............ | A47J 27/004 |
| 2019/0380177 A1* | 12/2019 | Chaimov | ................ | H05B 6/68 |
| 2020/0314972 A1* | 10/2020 | Guatta | ................ | H05B 6/70 |

FOREIGN PATENT DOCUMENTS

| | | | | |
|---|---|---|---|---|
| EP | 2953425 | A1 | 12/2015 | |
| EP | 3073803 | A1 * | 9/2016 | ............ H05B 6/686 |
| WO | 2016166695 | A1 | 10/2016 | |

OTHER PUBLICATIONS

International Search Report and Written Opinion of PCT/US2018/020873 dated May 24, 2018, all enclosed pages cited.

Office Action from related EP application No. 18712362.5-1202 dated Mar. 8, 2020, all pages herein cited in its entirety.

* cited by examiner

MODIFIED S-PARAMETER MEASUREMENT AND USAGE IN SOLID STATE RF OVEN ELECTRONICS

CROSS REFERENCE TO RELATED APPLICATION

This application claims priority to U.S. application No. 62/467,442 filed Mar. 6, 2017, the entire contents of which are hereby incorporated by reference in its entirety.

TECHNICAL FIELD

Example embodiments generally relate to ovens and, more particularly, relate to an oven that uses radio frequency (RF) heating provided by solid state electronic components and the calibration of equipment used in such oven.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality.

However, even by employing a combination of microwave and airflow, the limitations of conventional microwave cooking relative to penetration of the food product may still render the combination less than ideal. Moreover, a typical microwave is somewhat indiscriminate or uncontrollable in the way it applies energy to the food product. Thus, it may be desirable to provide further improvements to the ability of an operator to achieve a superior cooking result. Accordingly, efforts have been expended to create an oven with improved capabilities relative to cooking food with controllable RF energy.

The controllable RF energy may be used either alone or in combination with the application of convection energy to achieve superior results. However, the advantages provided by allowing control over the application of RF energy can quickly be lost or reduced if the levels or RF energy applied are not accurately known. As such, to truly achieve superior cooking results, it must be possible to accurately know the RF energy levels that are being applied within the cooking cavity of the oven. Accordingly, it may be desirable to provide a method and/or components for accurately calibrating the components of the oven. S parameter calculations have been used in the past for similar purposes. However, S parameters are typically calculated by a network analyzer with two ports to measure forward and reflected power for a device under test in a closed system. Yet, for an oven cavity, it is generally not possible to identify ports that effectively result in a closed system that could have S parameters measured in the conventional way. Consequently, a new method for determining a modified S parameter may be desirable.

BRIEF SUMMARY OF SOME EXAMPLES

Some example embodiments may therefore provide improved structures, methods and/or systems for applying heat to the food product in the oven. Moreover, such improvements may necessitate new arrangements for supporting or operating such structures or systems. In particular, for an oven that uses solid state components, instead of a magnetron, to generate RF energy, it may be desirable to define a way to calculate modified S parameters that can be used for calibration of the oven components.

In an example embodiment, an oven is provided. The oven may include a cooking chamber configured to receive a load and an RF heating system configured to provide RF energy into the cooking chamber using solid state electronic components. The solid state electronic components may include power amplifier electronics configured to provide a signal into the cooking chamber via an antenna assembly. The power amplifier electronics may include at least a first power amplifier and a second power amplifier operably coupled to the cooking chamber by respective ones of a first antenna and second antenna of the antenna assembly. The first and second antennas may be operably coupled to respective ones of the first and second power amplifiers via a first coupling structure and a second coupling structure, respectively. A directional coupler may be provided at a port section defined at at least one of the first and second coupling structures. The directional coupler may be configured to provide a forward power parameter and a reflected power parameter to a measurement assembly configured to calculate modified S parameters at the port section.

In an example embodiment, a measurement assembly for an oven is provided. The oven may include a cooking chamber configured to receive a load and a radio frequency (RF) heating system configured to provide RF energy into the cooking chamber using solid state electronic components. The solid state electronic components may include power amplifier electronics configured to provide a signal into the cooking chamber via an antenna assembly. The measurement assembly may include a directional coupler disposed at a port section defined at a first coupling structure that operably couples a first power amplifier of the power amplifier electronics to a first antenna of the antenna assembly. The directional coupler may be configured to passively extract a forward power parameter and a reflected power parameter from the port section to a measurement assembly configured to calculate modified S parameters at the port section.

Some example embodiments may improve the cooking performance or operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
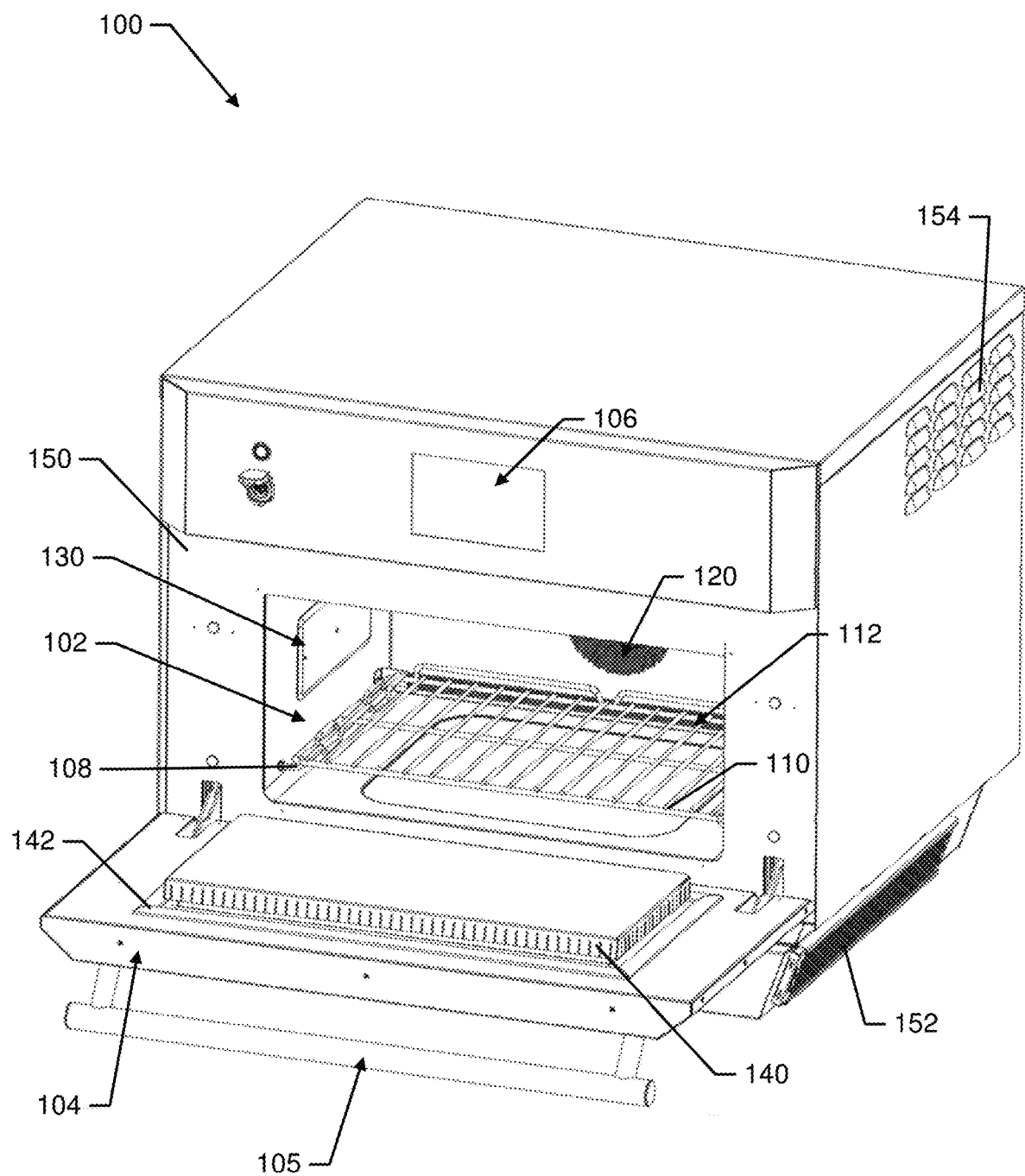
FIG. 1 illustrates a perspective view of an oven capable of employing at least two energy sources according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the cooking performance of an oven and/or may improve the operator experience of individuals employing an example embodiment. In this regard, the oven may cook food relatively quickly and uniformly, based on the application of RF energy under the instruction of control electronics that are configured to employ calibration strategies and structures described herein.

Scattering parameters or S parameters are specific elements of a scattering matrix or S matrix that is used to describe electrical network responses to various stimuli provided by electrical signals. S parameters generally use matched loads to characterize the electrical network using quantities that are measured in terms of wave or coupled voltage (e.g., forward wave and reflected wave). The scattering that is attempted to be measured or understood is an attempt to appreciate the way the RF energy and the traveling voltages and currents thereof are affected when they meet a discontinuity caused by, in common situations, going from a network to a transmission line. However, in example embodiments, the discontinuity is generally different in that it is a discontinuity encountered when transitioning from power amplifiers, transmission lines and antennas into a cooking cavity. Accordingly, example embodiments provide mechanisms by which to calculate modified S parameters that are descriptive of the unique characteristics created in the oven cavity, and that can be used for calibration of oven components.

In particular, example embodiments may enable an identification of the proper positions within the chain of components that feed RF energy into the cooking cavity to identify as ports at which to make modified S parameter measurements. Once the ports are identified, the corresponding measurements can be made to enable calculation of the modified S parameters. Thereafter, the modified S parameters may be used for calibration purposes so that the control of application of RF energy, which is a characteristic feature of the oven, can be accomplished accurately. Hereinafter, a specific example will be described in the context of a combination oven that uses both RF energy and another form of energy application for heating (e.g., convection heating). However, it should be appreciated that example embodiments could also be practiced in connection with any solid state RF energy cooking appliance, whether RF energy is the only or simply one of the cooking mechanisms employed.

FIG. 1 illustrates a perspective view of an oven 100 according to an example embodiment. As shown in FIG. 1, the oven 100 may include a cooking chamber 102 into which a food product may be placed for the application of heat by any of at least two energy sources that may be employed by the oven 100. The cooking chamber 102 may include a door 104 and an interface panel 106, which may sit proximate to the door 104 when the door 104 is closed. The door 104 may be operable via handle 105, which may extend across the front of the oven 100 parallel to the ground. In some cases, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a back or rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100.

In an example embodiment, food product placed on a pan or one of the racks 110 (or simply on a base of the cooking chamber 102 in embodiments where racks 110 are not employed) may be heated at least partially using radio frequency (RF) energy. Meanwhile, the airflow that may be provided may be heated to enable further heating or even browning to be accomplished. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide, strip line, coaxial cabling and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

In an example embodiment, a gasket 142 may be provided to extend around the periphery of the choke 140. In this regard, the gasket 142 may be formed from a material such as wire mesh, rubber, silicon, or other such materials that may be somewhat compressible between the door 104 and a periphery of the opening into the cooking chamber 102. The gasket 142 may, in some cases, provide a substantially air tight seal. However, in other cases (e.g., where the wire mesh is employed), the gasket 142 may allow air to pass therethrough. Particularly in cases where the gasket 142 is substantially air tight, it may be desirable to provide an air cleaning system in connection with the first air circulation system described above.

The antenna assembly 130 may be configured to generate controllable RF emissions into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a substantially hollow cavity within the oven body 150 that is disposed below the cooking chamber 102. The inlet array 152 may include multiple inlet ports that are disposed on each opposing side of the oven body 150 (e.g., right and left sides when viewing the oven 100 from the front) proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. Furthermore, the inlet array 152 is at least partially shielded from any direct communication path from the outlet louvers 154 by virtue of the fact that, at the oven sides (which include both portions of the inlet array 152 and outlet louvers 154), the shape of the basement is such that the tapering of the inlet array 152 is provided on walls that are also slightly inset to create an overhang 158 that blocks any air path between inlet and outlet. As such, air drawn into the inlet array 152 can reliably be expected to be air at ambient room temperature, and not recycled, expelled cooling air.

Figure 2:
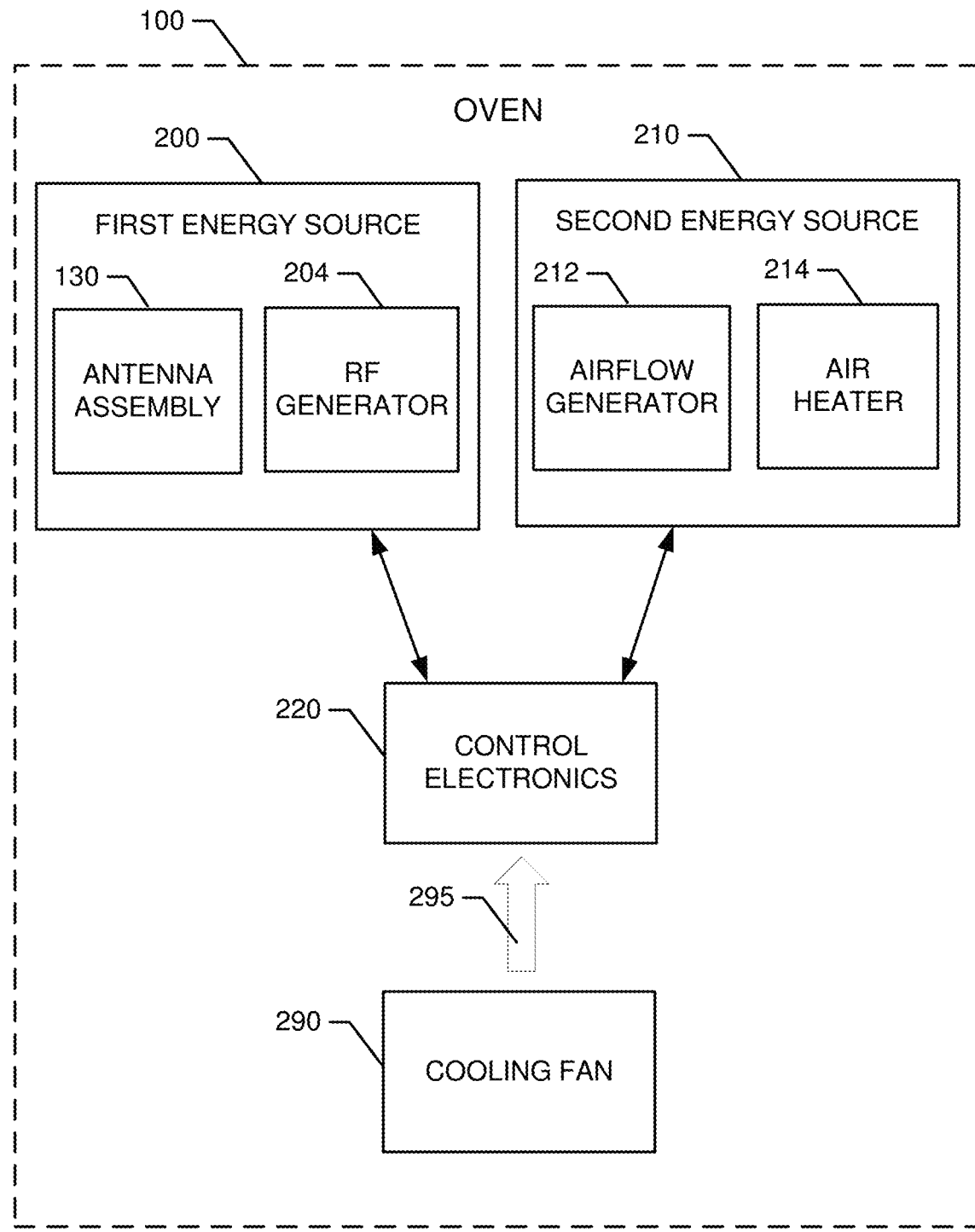
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments. Moreover, some example embodiments could be practiced in the context of an oven that includes only a single energy source (e.g., the second energy source 210). As such, example embodiments could be practiced on otherwise conventional ovens that apply heat using, for example, gas or electric power for heating.

As mentioned above, the first energy source 200 may be an RF energy source (or RF heating source) configured to generate relatively broad spectrum RF energy (e.g., electromagnetic energy) or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from the ISM bands for application by the RF generator 204.

In some cases, the antenna assembly 130 may be configured to transmit the RF energy into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, strip lines, coaxial cables, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking signatures, programs or recipes may be provided to define the cooking parameters to be employed for each of multiple potential cooking stages or steps that may be defined for the food product and the control electronics 220 may be configured to access and/or execute the cooking signatures, programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking signatures, programs or recipes.

As discussed above, the first air circulation system may be configured to drive heated air through the cooking chamber 102 to maintain a steady cooking temperature within the cooking chamber 102. Meanwhile, the second air circulation system may cool the control electronics 220. The first and second air circulation systems may be isolated from each other. However, each respective system generally uses differential pressures (e.g., created by fans) within various compartments formed in the respective systems to drive the corresponding air flows needed for each system. While the airflow of the first air circulation system is aimed at heating food in the cooking chamber 102, the airflow of the second air circulation system is aimed at cooling the control electronics 220. As such, cooling fan 290 provides cooling air 295 to the control electronics 220, as shown in FIG. 2.

The structures that form the air cooling pathways via which the cooling fan 290 cools the control electronics 220 may be designed to provide efficient delivery of the cooling air 295 to the control electronics 220, but also minimize fouling issues or dust/debris buildup in sensitive areas of the oven 100, or areas that are difficult to access and/or clean. Meanwhile, the structures that form the air cooling pathways may also be designed to maximize the ability to access and clean the areas that are more susceptible to dust/debris buildup. Furthermore, the structures that form the air cooling pathways via which the cooling fan 290 cools the control electronics 220 may be designed to strategically employ various natural phenomena to further facilitate efficient and effective operation of the second air circulation system. In this regard, for example, the tendency of hot air to rise, and the management of high pressure and low pressure zones necessarily created by the operation of fans within the system may each be employed strategically by the design and placement of various structures to keep certain areas that are hard to access relatively clean and other areas that are otherwise relatively easy to access more likely to be places where cleaning is needed.

Figure 3:
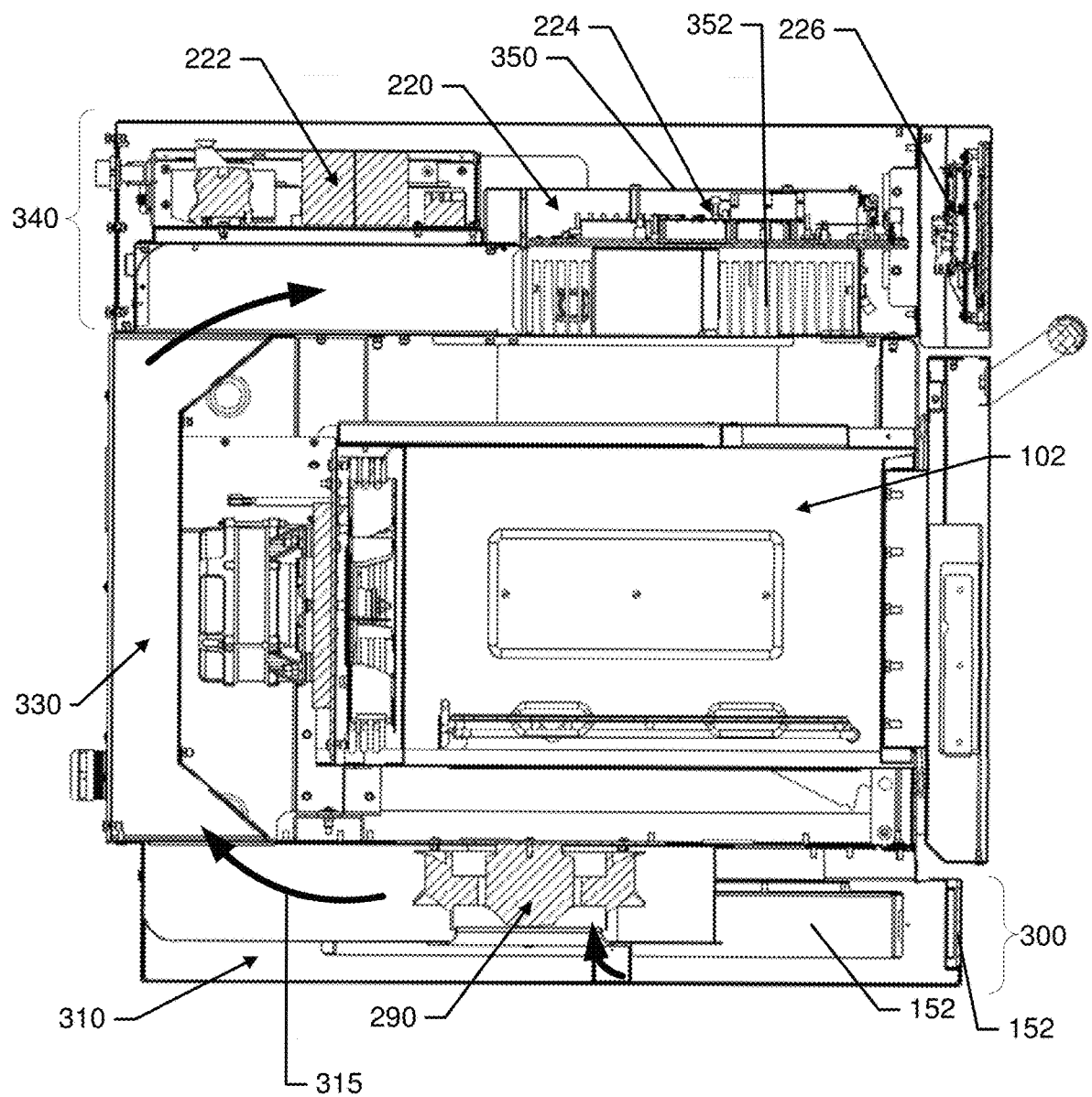
FIG. 3 shows a cross sectional view of the oven from a plane passing from the front to the back of the oven according to an example embodiment.

The typical airflow path, and various structures of the second air circulation system, can be seen in FIG. 3. In this regard, FIG. 3 shows a cross sectional view of the oven 100 from a plane passing from the front to the back of the oven 100. The basement (or basement region 300) of the oven 100 is defined below the cooking chamber 102, and includes an inlet cavity 310. During operation, air is drawn into the inlet cavity 310 through the inlet array 152 and is further drawn into the cooling fan 290 before being forced radially outward (as shown by arrow 315) away from the cooling fan 290 into a riser duct 330 (e.g., a chimney) that extends from the basement region 300 to the attic (or attic region 340) to turn air upward (as shown by arrow 315). Air is forced upward through the riser duct 330 into the attic region 340, which is where components of the control electronics 220 are disposed. The air then cools the components of the control electronics 220 before exiting the body 150 of the oven 100 via the outlet louvers 154. The components of the control electronics 220 may include power supply electronics 222, power amplifier electronics 224 and display electronics 226.

Upon arrival of air into the attic region 340, the air is initially guided from the riser duct 330 to a power amplifier casing 350. The power amplifier casing 350 may house the power amplifier electronics 224. In particular, the power amplifier electronics 224 may sit on an electronic board to which all such components are mounted. The power amplifier electronics 224 may therefore include one or more power amplifiers that are mounted to the electronic board for powering the antenna assembly 130. Thus, the power amplifier electronics 224 may generate a relatively large heat load. To facilitate dissipation of this relatively large heat load, the power amplifier electronics 224 may be mounted to one or more heat sinks 352. In other words, the electronic board may be mounted to the one or more heat sinks 352. The heat sinks 352 may include large metallic fins that extend away from the circuit board to which the power amplifier electronics 224 are mounted. Thus, the fins may extend downwardly (toward the cooking chamber 102). The fins may also extend in a transverse direction away from a centerline (from front to back) of the oven 100 to guide air provided into the power amplifier casing 350 and past the fins of the heat sinks 352.

Figure 4:
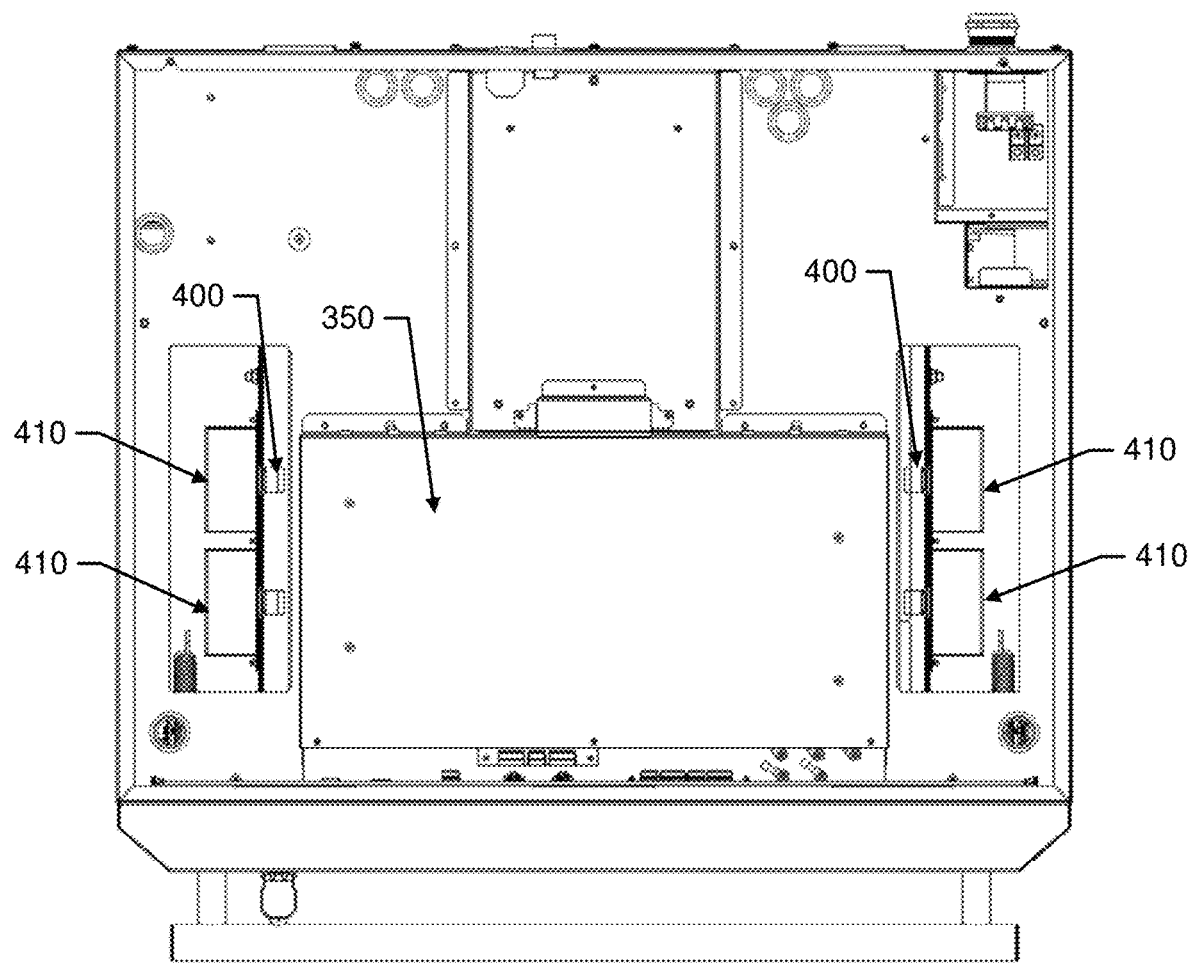
FIG. 4 is a top view of an attic region of the oven in accordance with an example embodiment.

FIG. 4 illustrates a top view of the attic region 340, and shows the power amplifier casing 350 and various components of the antenna assembly 130 including a launcher assembly 400 and waveguides of a waveguide assembly 410. Power is provided from the power amplifier electronics 224 to each launcher of the launcher assembly 400. The launcher assembly 400 operably couples a signal generated by the power amplifiers of the power amplifier electronics 224 into a corresponding one of the waveguides of the waveguide assembly 410 for communication of the corresponding signal into the cooking chamber 102 via the antenna assembly 130 as described above.

The power amplifier electronics 224 are defined by a plurality of electronic circuitry components including opamps, transistors and/or the like that are configured to generate waveforms at the corresponding power levels, frequencies and phases that are desired for a particular situation or cooking program. In some cases, the cooking program may select an algorithm for control of the power amplifier electronics 224 to direct RF emissions into the cooking chamber 102 at selected power levels, frequencies and phases. One or more learning processes may be initiated to select one or more corresponding algorithms to guide the power application. The learning processes may include detection of feedback on the efficacy of the application of power at specific frequencies (and/or phases) into the cooking chamber 102. In order to determine the efficacy, in some cases, the learning processes may measure efficiency and compare the efficiency to one or more thresholds. Efficiency may be calculated as the difference between forward power ($P_{fwd}$) and reflected power ($P_{refl}$), divided by the forward power ($P_{fwd}$). As such, for example, the power inserted into the cooking chamber 102 (i.e., the forward power) may be measured along with the reflected power to determine the amount of power that has been absorbed in the food product (or workload) inserted in the cooking chamber 102. The efficiency may then be calculated as: Efficiency (eff)=($P_{fwd}$−$P_{refl}$)/$P_{fwd}$.

As can be appreciated from the description above, the measurement of the efficiency of the delivery of RF energy to the food product may be useful in determining how effective a particular (e.g., a current) selection for a combination (or pair) of frequency and phase parameters of RF energy applied into the cooking chamber 102 is at delivering heat energy to the food product. Thus, the measurement of efficiency may be useful for selecting the best combination or algorithm for application of energy. The measurement of efficiency should therefore also desirably be as accurate as possible in order to ensure that meaningful control is affected by monitoring efficiency. However, if measurement of the specific parameters involved in measuring efficiency are inaccurate, then the value of the efficiency measurement may be compromised. Thus, it is desirable to use accurate measurements. As mentioned above, modified S parameters may be included among the parameters measured and used to improve operation of the oven 100. However, in order to measure the modified S parameters accurately, a unique and specific measurement paradigm must be designed and implemented.

Figure 5:
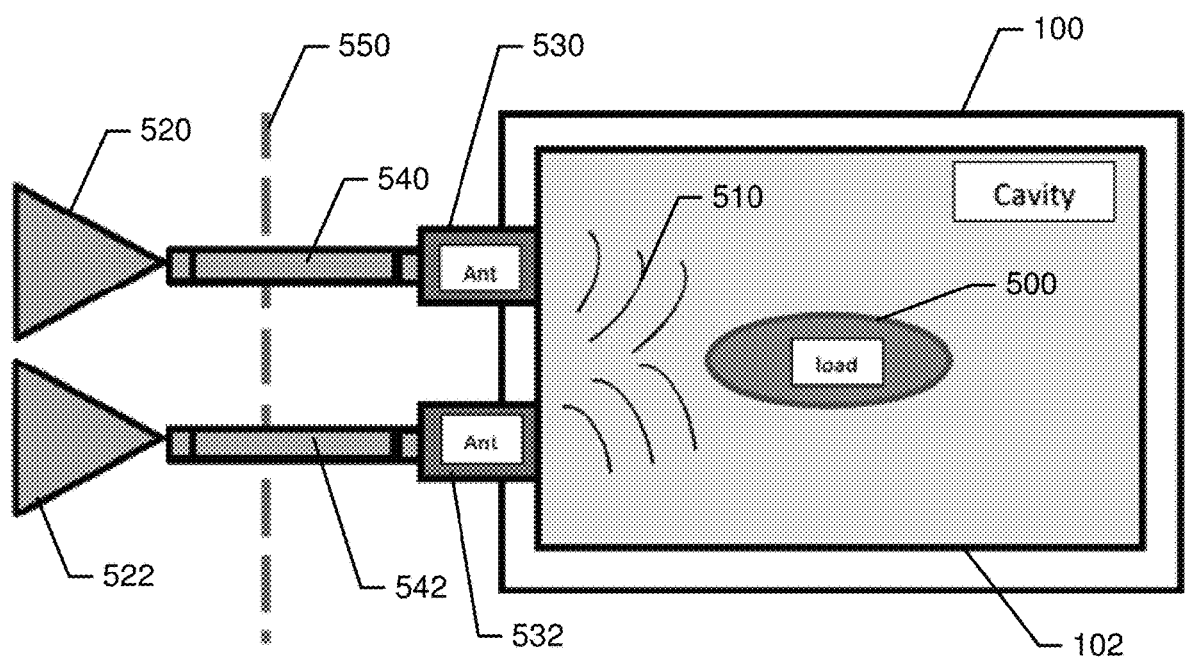
FIG. 5 illustrates a block diagram of portions of an antenna assembly and a cooking chamber of the oven in order to facilitate a description of port identification in accordance with an example embodiment.

FIG. 5 illustrates a block diagram of portions of the antenna assembly 130, and the cooking chamber 102 of the oven 100 in order to facilitate a description of port identification in accordance with an example embodiment. As discussed above, the theory of S parameter measurement is well known. However, an open cooking cavity such as the cooking chamber 102 of the oven 100 is not a typical component relative to the conventional methods for determining S parameters. In this regard, the natural port location for calculation of the S parameters would be at the antennas, which radiate into the cooking chamber 102. However, this is a far from ideal port location, and would make any calibration efforts attempted by measuring S parameters at this location exceedingly difficult. Accordingly, modified S parameters of an example embodiment may be determined using specific port locations and equipment that are located elsewhere.

As shown in FIG. 5, the cooking chamber 102 (or cavity) is located within the oven 100. A load 500 may be placed within the cooking chamber 102 and RF energy 510 may be provided into the cooking chamber 102 for application to the load 500. During normal operation, the load 500 may be a food product. However, during calibration and/or testing, the load 500 may be a dummy load or standard test load (e.g., water of a specific quantity). As indicated above, the RF energy 510 may be provided to the cooking chamber 102 via the antenna assembly 130 and its various components such as launcher assembly 400, waveguide assembly 410, and power amplifier electronics 224 (see FIGS. 3 and 4, for example). The power amplifier electronics 224 may include multiple power amplifiers, which may each be operably coupled to a respective RF chain including a respective instance of a launcher and corresponding antenna. In some cases, each RF chain may also include respective instances of strip line, coaxial cable, waveguide and/or the like to feed the RF energy to the launcher or directly into the cooking chamber 102.

In the example of FIG. 5, portions of the power amplifier electronics 224 (see FIG. 3) are represented by a first power amplifier 520 and a second power amplifier 522. However, it should be understood that more power amplifiers (e.g., four) may be used in some examples. The first and second power amplifiers 520 and 522 may each be operably coupled to respective first and second antennas 530 and 532 via a first coupling structure 540 and second coupling structure 542, respectively. As mentioned above, the first and second coupling structures 540 and 542 may each be instances of one or more of strip line, coaxial cable, waveguide and/or the like. System port locations may be defined at a port section 550 disposed between the output of the first and second power amplifiers 520 and 522 and the first and second antennas 530 and 532.

Figure 6A:
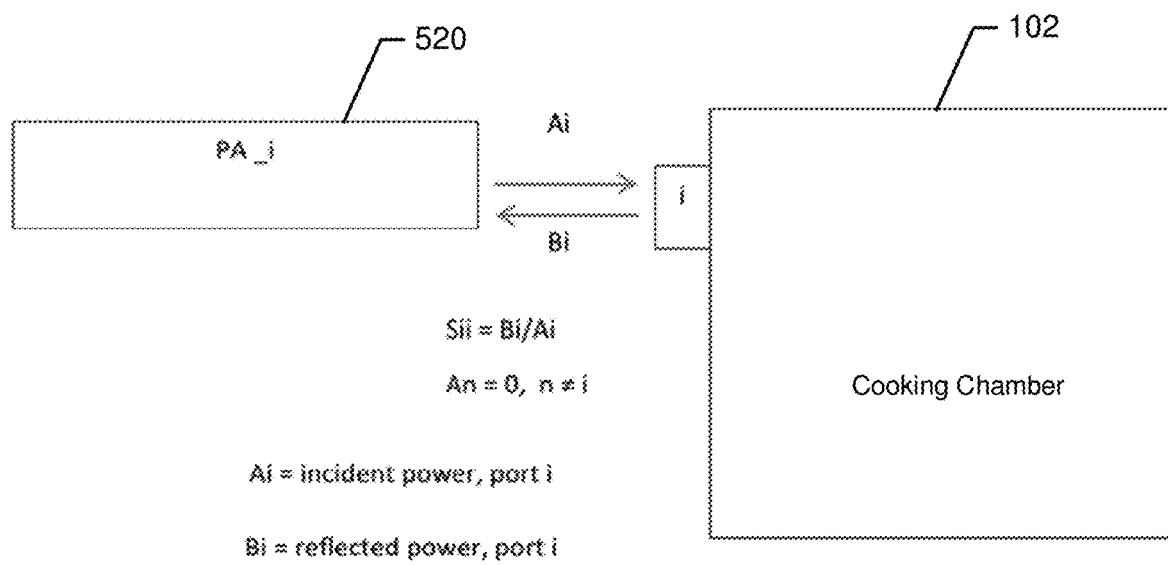
FIG. 6A illustrates a block diagram of a one port, modified S parameter calculation technique in accordance with an example embodiment.
Figure 6B:
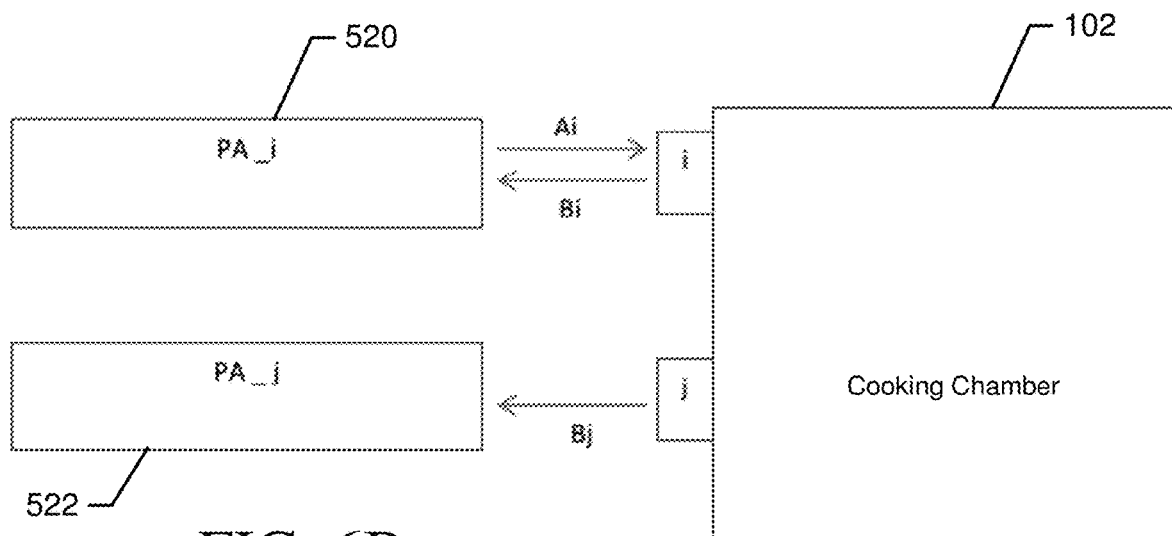
FIG. 6B illustrates a block diagram of a two-port, modified S parameter calculation technique in accordance with an example embodiment.

Modified S parameter definition will now be described in reference to FIGS. 6A and 6B. FIG. 6A illustrates a block diagram of a one port, modified S parameter calculation technique in accordance with an example embodiment. FIG. 6B illustrates a block diagram of a two-port, modified S parameter calculation technique in accordance with an example embodiment. As shown in FIG. 6A, a first port (i.e., port i) may be defined relative to the first power amplifier 520 (PA_i). The forward power (or incident power) for port i is referred to as Ai. Meanwhile, the reflected power for port i is referred to as Bi. In this example, there are n number of sources, and n does not equal i. As shown in FIG. 6A, the modified S parameter for port i (Sii), which can be determined from this arrangement, is the ratio of Bi to Ai. Thus, a modified S parameter can be calculated at each port for the ratio between reflected and forward power relative to power attributable to that port. However, when there are multiple ports, a contribution of reflected power is also experienced at other ports. Thus, FIG. 6B demonstrates that a modified S parameter can also be calculated in consideration of the reflected power at another port.

As shown in FIG. 6B, the forward power for port i is Ai and the reflected power for port i is Bi, while the reflected power for port j (measured at the second power amplifier 522 (PA_j) is Bj. The modified S parameter for port j (Sji), which can be determined from this arrangement, is the ratio of Bj to Ai.

Figure 7:
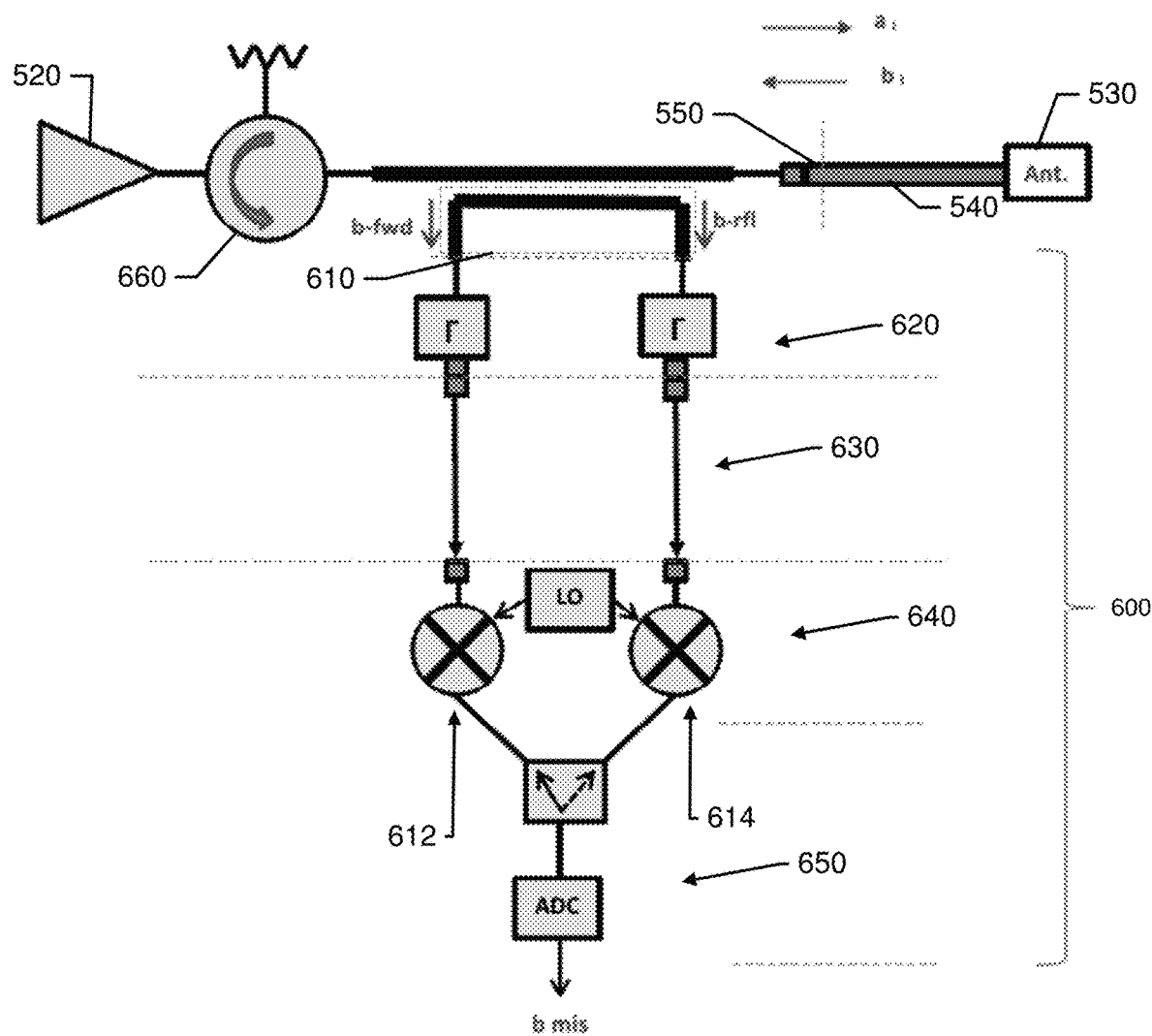
FIG. 7 illustrates a block diagram of a measurement assembly configured to determine modified S parameters in accordance with an example embodiment.

Having defined the system port locations at the port section 550 as described above, a mechanism by which to perform measurements must be established. An example of such a mechanism will be described in reference to FIG. 7, which illustrates a conceptual block diagram of a measurement assembly 600 for determining modified S parameters in accordance with an example embodiment. Of note, the measurement assembly 600 is shown in FIG. 7 in connection with just one system source (i.e., the first power amplifier 520). However, it should be appreciated that an equal number of instances of the measurement assembly 600 may be provided to the number of system sources in various example embodiments.

The measurement assembly 600 may be operably coupled to the port section 550 via a directional coupler 610. The directional coupler 610 may be used to extract measurement data from the port section 550 without otherwise influencing any signals traversing the port section 550. As such, the directional coupler 610 may be configured to extract forward wave parameters (e.g., b-fwd) in a first measurement leg 612 and reflected wave parameters (b-rfl) in a second measurement leg 614 based on the forward wave ($a_i$) and reflected wave ($b_i$) at the port section 550. After extraction by the directional coupler 610, extracted wave parameters may be passed through an adapting attenuator 620 (of the corresponding measurement leg) and corresponding connecting structures 630 to a down converter 640 (of the corresponding measurement leg). The down converter 640 of each of the first and second measurement legs 612 and 614 may be operably coupled to an analog-to-digital converter (ADC) 650. An output of the ADC 650 may be a scaled vector (b_mis) that is proportional to the actual wave parameters (b-fwd or b-rfl) extracted, dependent upon which measurement leg is selected for output to the ADC 650.

As shown in FIG. 7, the measurement assembly 600 may be positioned such that the directional coupler 610 extracts data from an isolated portion of the coupling structures (e.g., first and second coupling structures 540 and 542). Isolation may be provided, for example, by a circulator 660, which may be disposed between the power amplifier (e.g., first power amplifier 520) and the port section 550. The circulator 660 may ensure that any reflected wave does not impact or reach the corresponding power amplifier circuitry.

Figure 8:
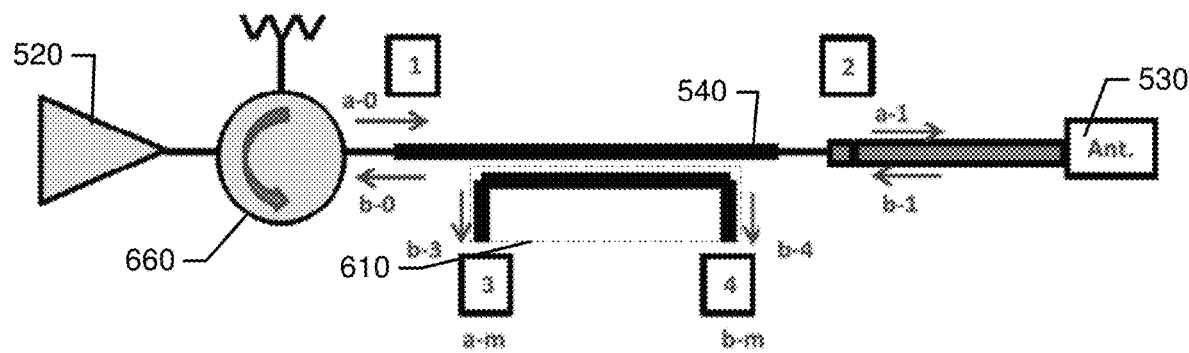
FIG. 8 illustrates a structure for one port, simplified calibration using modified S parameters in accordance with an example embodiment.
Figure 9:
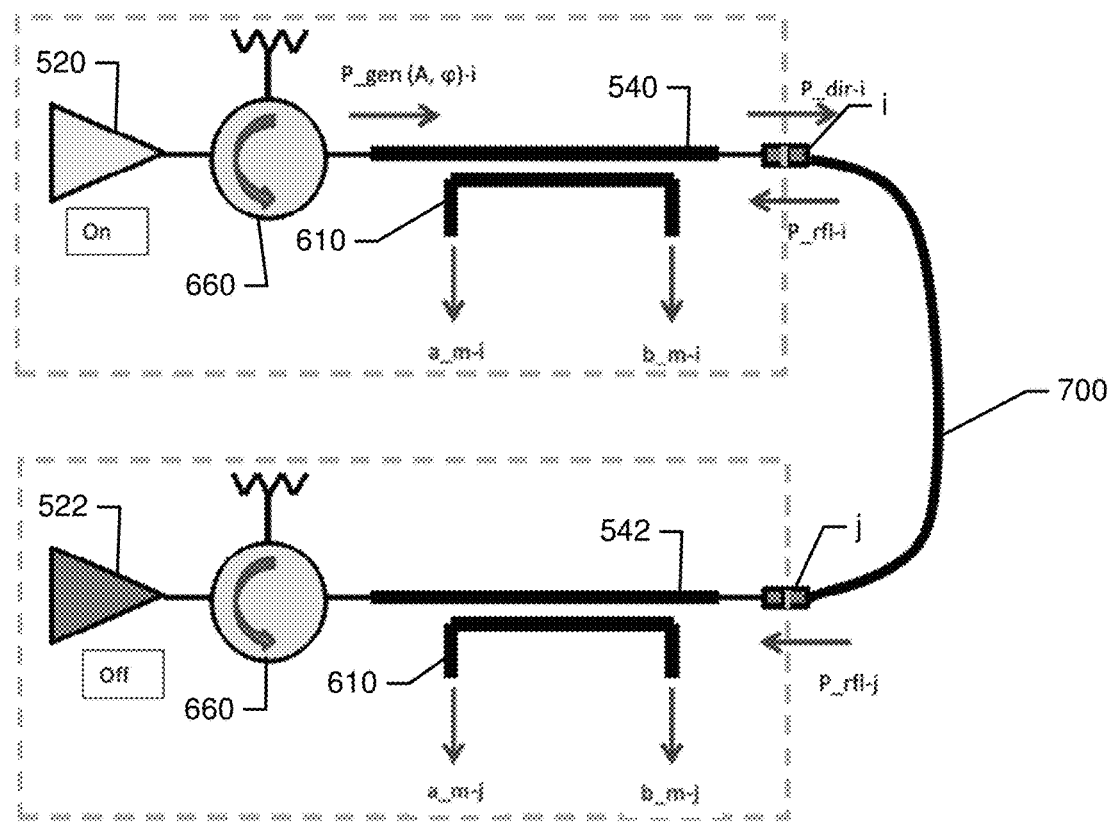
FIG. 9 illustrates two system ports and a connection that may be established to perform a transmission calibration procedure in accordance with an example embodiment.

Using the port definition described above, modified S parameters may be calculated. Thereafter, calibration of the oven 100 may be performed based on calibration of the modified S parameters. FIGS. 8 and 9 demonstrate block diagrams showing system components and the use thereof for calibration in accordance with an example embodiment. As discussed above, the modified S parameters are calculated by extracting data from the port section 550 defined above and determining a ratio between incident wave (or forward wave) and reflected wave parameters (e.g., $Sij=b_i/a_j$ when $a_k=0$ with $k \neq i$).

Calibration may be performed based on extracting actual wave parameters (e.g., $a_i$ and $b_i$) at any system port to determine the measured parameter b_mis. The calibration terms may compensate for any scaling of the vectors and measurement error compensation such as, for example, the directivity of the directional coupler 610. Many types of modified S parameter calibration may be capable of performance after the modified S parameters have been determined. However, for the oven 100 as described herein, the calibration procedure may be performed in a series of steps including 1) performing one port calibration followed by 2) performing a transmission calibration. The one port calibration may be applied to any single port. The one port calibration may be used to calibrate the reflection parameter measurement and make it possible to get an accurate measurement of the reflection coefficient at any port. A set of standard calibration loads may be used for performing this calibration. The transmission calibration may be used to calibrate the transmission between any coupled system ports and may compensate for the transmission losses and transfer phase.

FIG. 8 illustrates an example structure for one port, simplified calibration using modified S parameters (e.g., Sii parameter evaluation). A short/open/load (SOL) technique may be adopted in this step of calibration to calculate a ratio $b_1/a_1$ on the basis of available $a_m$ and $b_m$ measurements. In the example of FIG. 8, port mismatching and any coupler directivity errors can be compensated for to make the measurements more precise and reliable than simple scalar parameter evaluation would be. An error parameter matrix may link a measured reflection coefficient $\Gamma m = b_m/a_m$ to an actual reflection coefficient at the port section $\Gamma l = b_1/a_1$. Once the measures with the standard termination (SOL) are completed, then the error matrix parameters may be calculated and the $\Gamma i$ value can be calculated by the measured parameters $b_m$ and $a_m$ ($b_m$ corresponds to b_mis when the ADC 650 is connected to the reflected branch of the directional coupler, while $a_m$ corresponds to a_mis when the ADC 650 is connected to the forward (or direct) branch or leg of the directional coupler 610). The parameters are measured in amplitude and phase, by using the vector measurement and calculation at any step of the algorithm.

As can be appreciated from the descriptions above, definition of the port sections may be made at strategic locations relative to the amplifier output and any waveguide and/or antenna sections. The format of the calibration references may change as the position of the ports move from micro-strip section to waveguide section or antenna section. The points (1, 2, 3 and 4) on FIG. 8, with respective different parameter values associated therewith (e.g., a-0, a-1, b-0, b-1, b-3 and b-4) may represent different parameters present at each respective point to be considered when performing a calibration procedure dependent upon the nature of the coupling structure 540. In this regard, or a micro-strip section, short circuit can be developed by short-circuiting to ground the selected position on the output micro-strip and open circuit may be developed by interrupting the micro-strip in the same section. The interruption may need to be removed, granting a reliable continuity to the output of the micro-strip. For a waveguide section, short and open circuit sections may be developed with the use of a metal plane and a ferrite plane to be placed at the port position. For the antenna section, the definition of short/open/load becomes difficult to be defined, even if this is in theory the ideal section to define the cavity excitation ports. In practice, the micro-strip section may be selected to reduce system complexity and cost, with improved reliability and stability while also having high directivity and good matching. The calibration port section may be defined after the directional coupler and just before the transition to the antenna structure that drives the cooking chamber 102. The calibration references (open/short/load) for any port may be applied during a calibration session that is developed during the electronic assembly testing. The calibration parameters and the error parameters may be calculated and memorized inside the electronic controller for the life of the electronic equipment of the oven 100.

FIG. 9 illustrates two system ports and a connection that may be established to perform a transmission calibration procedure in accordance with an example embodiment. As shown in FIG. 9, a reference connection 700 may be provided between port i and port j. The reference connection 700 may be embodied as a coaxial cable having its losses and transfer phase properties being previously characterized or a reference waveguide connection (also previously characterized).

After one port calibration (as per FIG. 8) at any of the N ports of the system, correction parameters calculated for any port and the reference connection 700 may be used to calibrate the transmission S parameters Sii. The transmission S parameters Sii may then be calculated based on the available measurements of a_m-i, b_m-i, a_m-j, and b_m-j. The measurements may be performed by connecting the down converter alternatively to the directional couplers of the i and j ports, respectively. The vector format of the transmission parameters may be available along with the vector format of the reflection parameters. The set of Sii and Sij vectorial S parameters may be available for the oven 100 once the oven 100 has been calibrated as described above.

Figure 10:
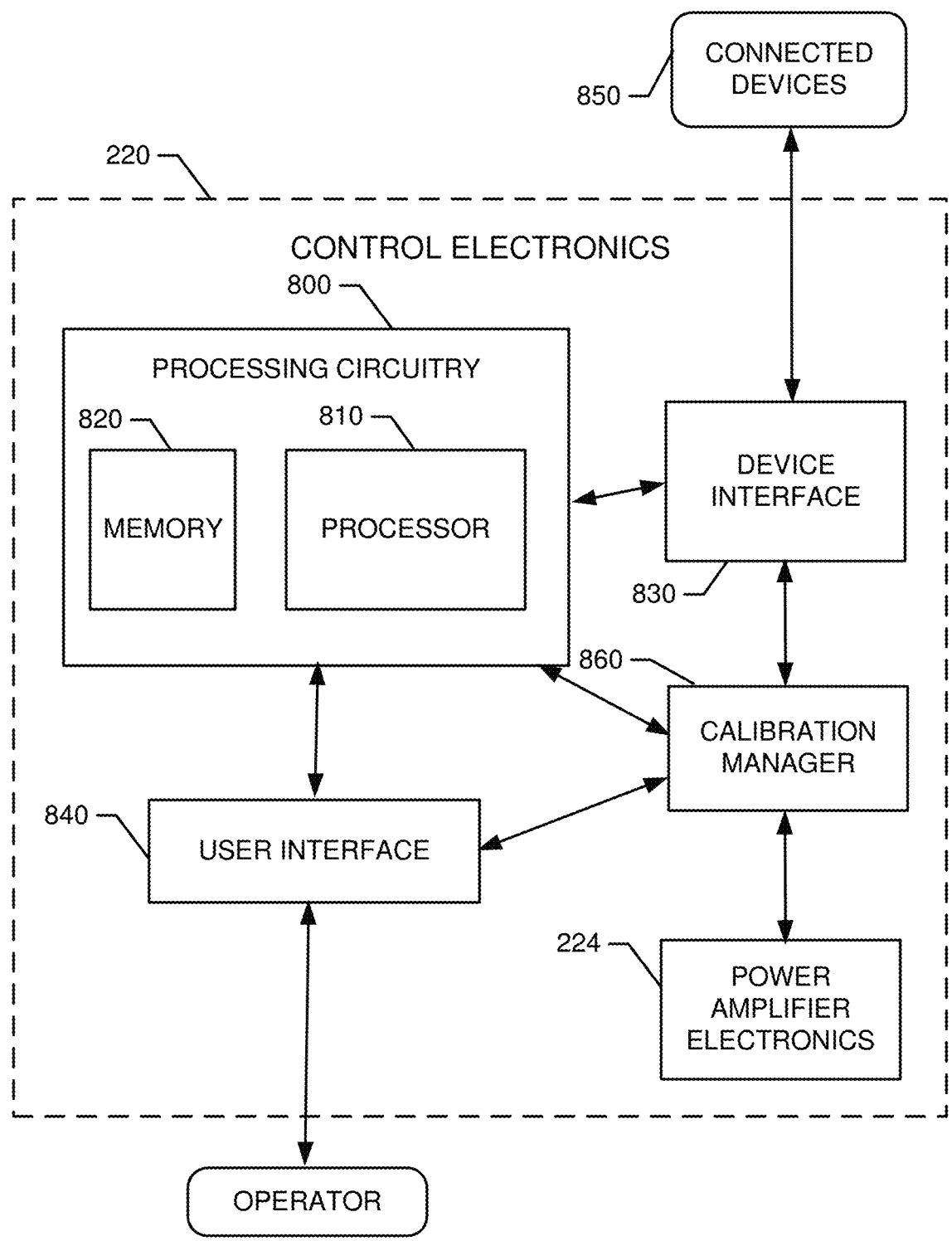
FIG. 10 is a block diagram of control electronics for providing the electronic circuitry for instantiation of a calibration system in accordance with an example embodiment.

FIG. 10 is a block diagram of control electronics 220 for providing the electronic circuitry for instantiation of a calibration system in accordance with an example embodiment. In some embodiments, the control electronics 220 may include or otherwise be in communication with processing circuitry 800 that is configurable to perform actions in accordance with example embodiments described herein. As such, for example, the functions attributable to the control electronics 220 may be carried out by the processing circuitry 800.

The processing circuitry 800 may be configured to perform data processing, control function execution and/or other processing and management services according to an example embodiment of the present invention. In some embodiments, the processing circuitry 800 may be embodied as a chip or chip set. In other words, the processing circuitry 800 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 800 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 800 may include one or more instances of each of a processor 810 and memory 820 that may be in communication with or otherwise control a device interface 830 and the user interface 840. As such, the processing circuitry 800 may be embodied as a circuit chip (e.g., an integrated circuit chip) configured (e.g., with hardware, software or a combination of hardware and software) to perform operations described herein. However, in some embodiments, the processing circuitry 800 may be embodied as a portion of an on-board computer.

The user interface 840 (which may be embodied as, include, or be a portion of the interface panel 106) may be in communication with the processing circuitry 800 to receive an indication of a user input at the user interface 840 and/or to provide an audible, visual, mechanical or other output to the user (or operator). As such, the user interface 840 may include, for example, a display (e.g., a touch screen such as the interface panel 106), one or more hard or soft buttons or keys, and/or other input/output mechanisms.

The device interface 830 may include one or more interface mechanisms for enabling communication with connected devices 850 such as, for example, other components of the oven 100, sensors of a sensor network of the oven 100, removable memory devices, wireless or wired network communication devices, and/or the like. In some cases, the device interface 830 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 830 may receive input at least from the measurement assembly 600 described above, or receives input including any of the other parameters described above, in order to communicate such parameters to a calibration manager 860. Alternatively or additionally, the device interface 830 may provide interface mechanisms for any devices capable of wired or wireless communication with the processing circuitry 800. In still other alternatives, the device interface 830 may provide connections and/or interface mechanisms to enable the processing circuitry 800 to control the various components of the oven 100.

In an exemplary embodiment, the memory 820 may include one or more non-transitory memory devices such as, for example, volatile and/or non-volatile memory that may be either fixed or removable. The memory 820 may be configured to store information, data, cooking signatures, programs, recipes, applications, instructions or the like for enabling the control electronics 220 to carry out various functions in accordance with example embodiments of the present invention. For example, the memory 820 could be configured to buffer input data for processing by the processor 810. Additionally or alternatively, the memory 820 could be configured to store instructions for execution by the processor 810. As yet another alternative, the memory 820 may include one or more databases that may store a variety of data sets responsive to input from the sensor network, or responsive to programming of any of various cooking programs. Among the contents of the memory 820, applications may be stored for execution by the processor 810 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 810 and stored in memory 820 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results. In still other examples, data tables may be stored to define calibration values and/or diagnostic values, as described above. Alternatively or additionally, the memory 820 may store applications for defining responses to stimuli including the generation of protective actions and/or notification functions. In yet other examples, the memory 820 may store algorithms for determining the parameters described above, and for conducting calibration in accordance with the descriptions provided herein.

The processor 810 may be embodied in a number of different ways. For example, the processor 810 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 810 may be configured to execute instructions stored in the memory 820 or otherwise accessible to the processor 810. As such, whether configured by hardware or by a combination of hardware and software, the processor 810 may represent an entity (e.g., physically embodied in circuitry—such as in the form of processing circuitry 800) capable of performing operations according to example embodiments of the present invention while configured accordingly. Thus, for example, when any instance of the processor 810 is embodied as an ASIC, FPGA or the like, the processor 810 may be specifically configured hardware for conducting the operations described herein. Alternatively, as another example, when the processor 810 is embodied as one or more executors of software instructions, the instructions may specifically configure the processor 810 to perform the operations described herein.

In an example embodiment, the processor 810 (or the processing circuitry 800) may be embodied as, include or otherwise control the control electronics 220 and/or the calibration manager 860. As such, in some embodiments, the processor 810 (or the processing circuitry 800) may be said to cause each of the operations described in connection with the control electronics 220 and/or the calibration manager 860 by directing the control electronics 220 and/or the calibration manager 860, respectively, to undertake the corresponding functionalities responsive to execution of instructions or algorithms configuring the processor 810 (or processing circuitry 800) accordingly. As an example, the control electronics 220 (or more specifically, the calibration manager 860) may be configured to control the responses to various stimuli associated with detecting the parameters and/or values discussed above in reference to FIGS. 5-9. Moreover, the control electronics 220 may be configured to determine the parameters and perform calibration techniques using the parameters determined by or received at the control electronics 220 (or the calibration manager 860). In some cases, a separate instance of a processor (or processors) and memory may be associated with different parts of the control electronics 220 (e.g., including separate processors for the control of the power amplifier electronics 224 and the calibration manager 860 amongst potentially others).

In an example embodiment, the control electronics 220 may also access and/or execute instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s)

disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process, and may also perform protective functions as described herein. Finally, the control electronics 220 may execute instructions for calibration and/or fault analysis. Accordingly, for example, the control electronics 220 (or more specifically, the calibration manager 860) may be configured to act locally to facilitate calibration of the power amplifier electronics 224.

In an example embodiment, an oven may be provided. The oven may include a cooking chamber configured to receive a load and an RF heating system configured to provide RF energy into the cooking chamber using solid state electronic components. The solid state electronic components include power amplifier electronics configured to provide a signal into the cooking chamber via an antenna assembly. The power amplifier electronics include at least a first power amplifier and a second power amplifier operably coupled to the cooking chamber by respective ones of a first antenna and second antenna of the antenna assembly. The first and second antennas are operably coupled to respective ones of the first and second power amplifiers via a first coupling structure and a second coupling structure, respectively. A directional coupler is provided at a port section defined at at least one of the first and second coupling structures. The directional coupler is configured to provide a forward parameter (e.g., a forward power or wave parameter) and a reflected parameter (e.g., a reflected power or wave parameter) to a measurement assembly configured to calculate modified S parameters at the port section.

In some embodiments, additional optional features may be included or the features described above may be modified or augmented. Each of the additional features, modifications or augmentations may be practiced in combination with the features above and/or in combination with each other. Thus, some, all or none of the additional features, modification or augmentations may be utilized in some embodiments. For example, in some cases, the directional coupler may be disposed downstream of a circulator relative to the power amplifier electronics. In some examples, the measurement assembly may include a first measurement leg configured to measure a forward wave parameter, and a second measurement leg configured to measure a reflected wave parameter. The first and second measurement legs may be operably coupled to respective opposing ends of the directional coupler. However, it should also be appreciated that it is possible to have two separate couplers, one dedicated to the forward wave and the second to the reflected wave. As such, the two legs can be physically separated, each one with a dedicated directional coupler such that the first coupler couples the forward wave and the second coupler couples the reflected wave. In an example embodiment, the first and second measurement legs may each include an adapting attenuator, corresponding connecting structures, and a down converter. In such an example, the down converter of each of the first and second measurement legs may be operably coupled to a common ADC. An output of the ADC may be the modified S parameter and may be associated with a selected one of the forward wave parameter or the reflected wave parameter. In some cases, a first modified S parameter calculated for the first power amplifier may include a ratio of the reflected wave parameter to the forward wave parameter generated by the first power amplifier and measured at a first directional coupler associated with the first power amplifier. In an example embodiment, a second modified S parameter calculated for the second power amplifier may include a ratio of the reflected wave parameter attributable to the first power amplifier to the forward wave parameter generated by the first power amplifier and measured at a second directional coupler associated with the second power amplifier. In some embodiments, the measurement assembly may be operably coupled to a calibration manager. The calibration manager may be configured to receive the modified S parameters to perform calibration of the power amplifier electronics. In some cases, the calibration of the power amplifier electronics may include performing one port calibration followed by performing a transmission calibration. In an example embodiment, the transmission calibration may be performed at least in part by turning the first power amplifier on while the second power amplifier is off, while a reference connection is disposed between a first port associated with the first power amplifier and a second port associated with the second power amplifier. The transmission calibration may include measuring modified S parameters at the directional coupler associated with each respective one of the first and second power amplifiers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
   a cooking chamber configured to receive a load; and
   a radio frequency (RF) heating system configured to provide RF energy into the cooking chamber using solid state electronic components,
   wherein the solid state electronic components include power amplifier electronics configured to provide a signal into the cooking chamber via an antenna assembly,
   wherein the power amplifier electronics include at least a first power amplifier and a second power amplifier operably coupled to the cooking chamber by respective ones of a first antenna and second antenna of the antenna assembly, the first and second antennas being operably coupled to respective ones of the first and second power amplifiers via a first coupling structure and a second coupling structure, respectively, wherein a directional coupler is provided at a port section defined at at least one of the first and second coupling structures, wherein the directional coupler is configured to provide a forward parameter and a reflected parameter to a measurement assembly configured to calculate modified S parameters at the port section, wherein the measurement assembly comprises a first measurement leg configured to measure a forward wave parameter, and a second measurement leg configured to measure a reflected wave parameter, the first and second measurement legs being operably coupled to respective opposing ends of the directional coupler, wherein the first and second measurement legs each include an adapting attenuator, corresponding connecting structures, and a down converter, wherein the modified S parameter calculated comprises a scaled vector proportional to a selected one of the forward wave parameter or the reflected wave parameter, wherein the down converter of each of the first and second measurement legs is operably coupled to a common analog-to-digital converter (ADC), and wherein an output of the ADC is the modified S parameter comprising the scaled vector proportional to the selected one of the forward wave parameter or the reflected wave parameter.

2. The oven of claim 1, wherein the directional coupler is disposed downstream of a circulator relative to the power amplifier electronics.

3. The oven of claim 1, wherein a first modified S parameter calculated for the first power amplifier comprises a ratio of the reflected wave parameter to the forward wave parameter generated by the first power amplifier and measured at a first directional coupler associated with the first power amplifier.

4. The oven of claim 3, wherein a second modified S parameter calculated for the second power amplifier comprises a ratio of the reflected wave parameter attributable to the first power amplifier to the forward wave parameter generated by the first power amplifier and measured at a second directional coupler associated with the second power amplifier.

5. The oven of claim 1, wherein the measurement assembly is operably coupled to a calibration manager, the calibration manager being configured to receive the modified S parameters to perform calibration of the power amplifier electronics.

6. The oven of claim 5, wherein the calibration of the power amplifier electronics comprises performing one port calibration followed by performing a transmission calibration.

7. A measurement assembly for an oven comprising a cooking chamber configured to receive a load and a radio frequency (RF) heating system configured to provide RF energy into the cooking chamber using solid state electronic components, the solid state electronic components including power amplifier electronics configured to provide a signal into the cooking chamber via an antenna assembly, the measurement assembly comprising:

a directional coupler disposed at a port section defined at a first coupling structure that operably couples a first power amplifier of the power amplifier electronics to a first antenna of the antenna assembly, wherein the directional coupler is configured to passively extract a forward parameter and a reflected parameter from the port section to the measurement assembly configured to calculate modified S parameters at the port section, wherein the measurement assembly comprises a first measurement leg extending from the directional coupler and configured to measure a forward wave parameter, and a second measurement leg extending from the directional coupler and configured to measure a reflected wave parameter, wherein the first and second measurement legs each include an adapting attenuator, corresponding connecting structures, and a down converter, wherein the modified S parameter calculated comprises a scaled vector proportional to a selected one of the forward wave parameter or the reflected wave parameter, wherein the down converter of each of the first and second measurement legs is operably coupled to a common analog-to-digital converter (ADC), and wherein an output of the ADC is the modified S parameter comprising the scaled vector proportional to the selected one of the forward wave parameter or the reflected wave parameter.

8. The measurement assembly of claim 7, wherein a first modified S parameter calculated for the first power amplifier comprises a ratio of the reflected wave parameter to the forward wave parameter generated by the first power amplifier and measured at a first directional coupler associated with the first power amplifier.

9. The measurement assembly of claim 8, wherein a second modified S parameter calculated for the second power amplifier comprises a ratio of the reflected wave parameter attributable to the first power amplifier to the forward wave parameter generated by the first power amplifier and measured at a second directional coupler associated with the second power amplifier.

10. The measurement assembly of claim 7, wherein the power amplifier electronics further include at least a second power amplifier operably coupled to the cooking chamber by a second antenna of the antenna assembly, the second antenna being operably coupled to the second power amplifier via a second coupling structure.

11. The measurement assembly of claim 10, wherein the measurement assembly is operably coupled to a calibration manager, the calibration manager being configured to receive the modified S parameters to perform calibration of the power amplifier electronics.

12. The measurement assembly of claim 11, wherein the calibration of the power amplifier electronics comprises performing one port calibration followed by performing a transmission calibration.

13. The measurement assembly of claim 12, wherein the transmission calibration is performed at least in part by turning the first power amplifier on while the second power amplifier is off, while a reference connection is disposed between a first port associated with the first power amplifier and a second port associated with the second power amplifier, and measuring modified S parameters at the directional coupler associated with each respective one of the first and second power amplifiers.

* * * * *